(12) United States Patent
Kobayashi

(10) Patent No.: US 8,125,668 B2
(45) Date of Patent: Feb. 28, 2012

(54) INFORMATION PROCESSING DEVICE, IMAGE PROCESSING DEVICE, JOB PROCESSING METHOD, AND STORAGE MEDIUM

(75) Inventor: Noriyuki Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1135 days.

(21) Appl. No.: 11/682,436

(22) Filed: Mar. 6, 2007

(65) Prior Publication Data

US 2007/0216940 A1 Sep. 20, 2007

(30) Foreign Application Priority Data

Mar. 14, 2006 (JP) .................. 2006-068731

(51) Int. Cl.
*G06F 3/12* (2006.01)
*G06K 1/00* (2006.01)
(52) U.S. Cl. ....................... 358/1.15; 358/1.1
(58) Field of Classification Search .................. 358/1.1, 358/1.9, 1.13, 1.15, 1.18, 474, 448, 402; 709/201, 203, 213, 245; 707/636, 652, 709, 707/721
See application file for complete search history.

(56) References Cited

U.S. PATENT DOCUMENTS

| | | | | |
|---|---|---|---|---|
| 6,230,189 B1 * | 5/2001 | Sato et al. | ..................... | 709/206 |
| 7,145,670 B2 * | 12/2006 | Keane et al. | ................. | 358/1.13 |
| 7,495,796 B2 * | 2/2009 | Keane et al. | ................. | 358/1.18 |
| 7,860,892 B2 * | 12/2010 | Sato | .............................. | 707/796 |
| 2002/0049847 A1 * | 4/2002 | McArdle et al. | ............... | 709/227 |
| 2002/0069260 A1 * | 6/2002 | Tagg | .............................. | 709/218 |
| 2003/0112464 A1 * | 6/2003 | Garcia et al. | .................. | 358/1.15 |
| 2004/0190057 A1 * | 9/2004 | Takahashi et al. | ............ | 358/1.15 |
| 2005/0198069 A1 * | 9/2005 | Cherry et al. | ............... | 707/104.1 |
| 2005/0275862 A1 | 12/2005 | Matsumoto et al. | | |
| 2005/0275881 A1 | 12/2005 | Akashi et al. | | |
| 2005/0275882 A1 | 12/2005 | Yasuda et al. | | |
| 2005/0275883 A1 | 12/2005 | Kobayashi et al. | | |
| 2005/0275884 A1 | 12/2005 | Matsukubo et al. | | |
| 2005/0289215 A1 | 12/2005 | Namikata et al. | | |
| 2006/0028678 A1 | 2/2006 | Negishi et al. | | |
| 2007/0216940 A1 | 9/2007 | Kobayashi | | |

FOREIGN PATENT DOCUMENTS

JP 2003036195 2/2003

* cited by examiner

*Primary Examiner* — Gabriel Garcia
(74) *Attorney, Agent, or Firm* — Fitzpatrick, Cella, Harper & Scinto

(57) ABSTRACT

An information processing device, capable of communicating with an image processing device, has: an acceptance unit to accept an instruction as to whether or not to add, to a print job, browsing management information corresponding to an original file of the print job; and a transfer unit to, in a case where the acceptance unit accepts the instruction to add the browsing management information, add the browsing management information to the print job and transfer the acquired print job to the image processing device, and, in a case where the acceptance unit does not accept the instruction to add the browsing management information, transfer the print job to the image processing device without adding the browsing management information.

11 Claims, 13 Drawing Sheets

FIG. 15

STORAGE MEDIUM SUCH AS FD, CD-ROM

| DIRECTORY INFORMATION |
|---|
| 1ST DATA PROC PROGRAM<br>PROGRAM CODE GROUP CORRESPONDING<br>TO STEPS IN FLOW CHART OF FIG. 10 |
| 2ND DATA PROC PROGRAM<br>PROGRAM CODE GROUP CORRESPONDING<br>TO STEPS IN FLOW CHART OF FIG. 12 |
| |

MEMORY MAP OF STORAGE MEDIUM

INFORMATION PROCESSING DEVICE, IMAGE PROCESSING DEVICE, JOB PROCESSING METHOD, AND STORAGE MEDIUM

BACKGROUND OF THE INVENTION

1. Field of the Invention

The present invention relates to a job process to be executed in an image processing system capable of communicating with an image processing device executing an image process on a network.

2. Description of the Related Art

Conventionally, an image processing device which exists on a network and executes an image process for a print job requested by a user has been proposed. The image processing device of this type executes the image process for the print job and then holds a print job history of the relevant print job. Further, an image processing system which enables a client on the network to browse the print job history of the image processing device has bee proposed.

Further, an image processing system which stores data extracted to an bitmap image for print output in a storage unit provided in an image processing device, and enables a client to browse the extracted bitmap image has been proposed (Japanese Patent Application Laid-Open No. 2003-36195).

Conventionally, to know the whereabouts of an original file from which a handout is distributed in a conference, a meeting or the like, it is necessary to inquire the whereabouts of the original file of a person who distributed it. For this reason, some kind or another troublesome assistance is necessary in a case where processing and editing of the original file is intended. Consequently, it is inconvenient in case of reprocessing the original file.

Further, in a case where the file is managed in the storage unit provided in the image processing system, a security protection function and reliability are demanded, whereby the image processing device often becomes expensive. Consequently, the image processing device of this type is unsuitable for an office which cannot increase the cost for business management.

Furthermore, in the above-described conventional image processing system, if a person who executes print output does not consciously store the file in the image processing device, a person at the file distribution destination cannot acquire original data of the relevant file.

SUMMARY OF THE INVENTION

The present invention has been completed to solve such problems as described above. That is, an object of the present invention is to provide a mechanism capable of more easily knowing the whereabouts of an original file of a printed material printed by an image processing device, and thus capable of easily acquiring the original file.

According to a first aspect of the present invention, there is provided an information processing device, capable of communicating with an image processing device, which comprises: an acceptance unit adapted to accept an instruction as to whether or not to add, to a print job, browsing management information corresponding to an original file of the print job; and a transfer unit adapted to, in a case where the acceptance unit accepts the instruction to add the browsing management information, add the browsing management information to the print job and transfer the acquired print job to the image processing device, and, in a case where the acceptance unit does not accept the instruction to add the browsing manage- ment information, transfer the print job to the image processing device without adding the browsing management information.

According to a second aspect of the present invention, there is provided an image processing device, of processing a print job, which comprises: a storage unit adapted to store a history of the print job; a registration unit adapted to register, in the storage unit, browsing management information corresponding to an original file of the print job to be added to the print job; and a print unit adapted to discriminatively print the browsing management information registered by the registration unit, together with print data based on the print job.

Other features, objects and advantage of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 15 is a diagram for describing a memory map of a storage medium which stores therein various data processing programs capable of being read by the image processing device according to the present invention.

DESCRIPTION OF THE EMBODIMENTS

Hereinafter, the exemplary embodiments of the present invention will be described with reference to the attached drawings.

First Exemplary Embodiment

Figure 1:
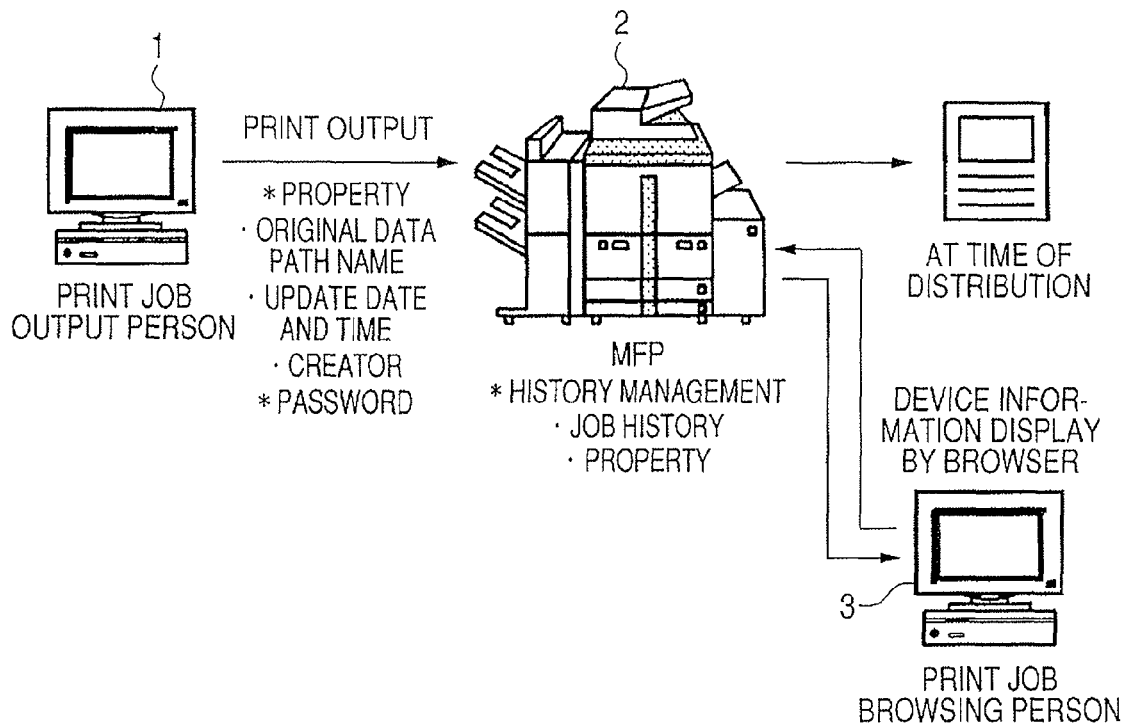
FIG. 1 a diagram illustrating the whole constitution of an image processing system to which an information processing device and an image processing device according to a first exemplary embodiment of the present invention are applicable.

FIG. 1 a diagram illustrating the whole constitution of an image processing system to which an information processing device and an image processing device according to the first exemplary embodiment of the present invention are applicable. In the first exemplary embodiment, a print job output person executes a print output process for a document existing on own PC (personal computer) or another PC shared on a network, to an MFP (multi function printer) 2.

In FIG. 1, the PC 1 of the print job output person, a PC 3 of a print job browsing person (i.e., a person to whom a printed paper is distributed), and the MFP 2 which functions as the image processing device exist under a network-connected environment. Incidentally, each of the PC 1 and the PC 3 has a controller unit including a CPU, a ROM, a RAM and the like, and thus executes a process for an output device such as a display device based on an operation of a keyboard, a pointing device or the like which acts as an input device.

Further, a predetermined OS (operating system) has been installed in each of the PC 1 and the PC 3, whereby each PC activates an application, a printer driver and the like under the control of the installed OS to execute a data process, a print job generation process and the like. Incidentally, the PC 3 functions as the PC for the browsing person who browses a print job registered in the MFP 2.

In an ordinary print operation, when application data on the PC 1 is output to the MFP 2, the relevant data is converted into PDL (page description language) data on the printer driver of the PC 1, and the acquired PDL data is transmitted to the MFP 2.

Incidentally, the PC 1 transmits, in addition to the PDL data, an attribute of the file of the application data and a password for browsing such an attribute file to the MFP 2 based on a predetermined protocol.

Further, the PC 1 extracts information representing the property capable of browsing the attribute of file of the application data on a Windows™ PC, and transmits the extracted information to the MFP 2 based on a predetermined protocol.

Furthermore, the contents of such file attribute information may include, for example, a path name (PC name, directory, file name), a file creator, a file size, a file creation date and time, a file update history, and the like.

In the present embodiment, papers (documents) which were print output by the MFP 2 are distributed to, for example, conferees in a conference or the like. After then, it is conceivable to execute a process of browsing the print job in order to collect information such as the whereabouts of original data of the distributed document, creation date and time, and the like.

Here, as a browsing unit, a generally used unit of browsing device information of the MFP 2 by using a browser through a network may be used. In any case, on such an assumption as described above, the print job browsing person is often the same as the person to whom the printed paper is distributed in the conference. However, the mechanism of the first exemplary embodiment is not limited to such a case.

(Operation on Printer Driver)

Figure 2:
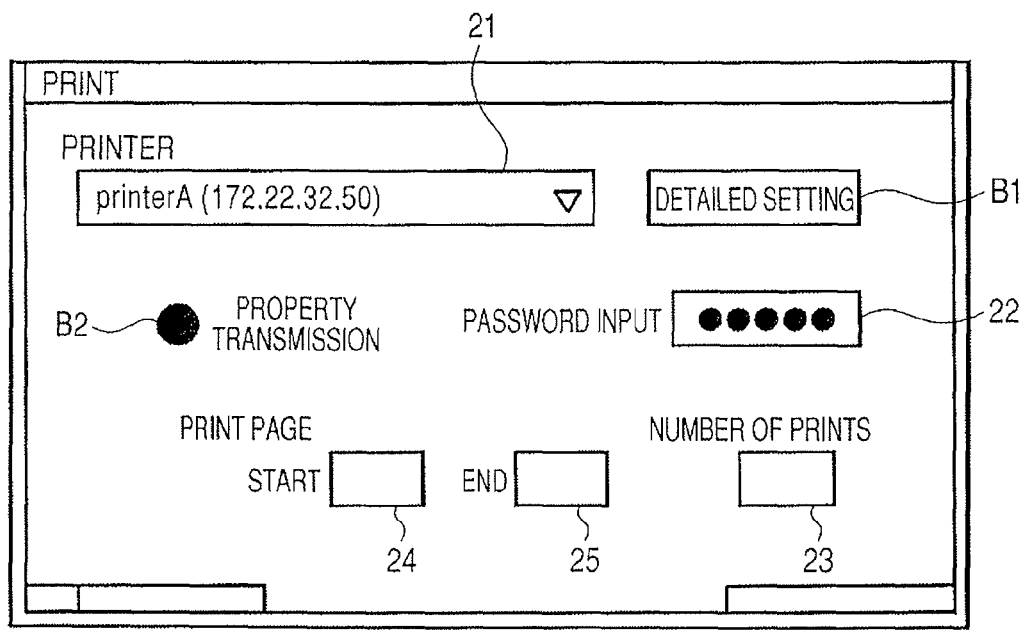
FIG. 2 is a diagram illustrating an example of a screen of a printer driver to be displayed on a display unit provided in a PC (personal computer) illustrated in FIG. 1.

FIG. 2 is a diagram illustrating an example of a screen of the printer driver to be displayed on the display unit provided in the PC 1 illustrated in FIG. 1. More specifically, the screen illustrated in FIG. 2 is provided by the printer driver when a print request is selected from the application.

In FIG. 2, a printer name selection section 21 indicates a status that a printer of which the name is "A" is currently selected. Besides, a password for permitting a browsing person to browse the attribute information stored in the MFP 2 is input to a password input section 22.

The number of prints intended by the user is input to a print number input section 23, a start page is input to a print designation page input section 24, and an end page is input to a print designation page input section 25.

As well as the ordinary printer driver, the user can select the intended output printer by handling the printer name selection section 21, and also can designate the number of print outputs by inputting numeric values to the print number input section 23. Further, the user can designate the pages to be print output by inputting numeric values to the print designation page input sections 24 and 25. Moreover, the user can designate detailed formats concerning paper output by selecting a detailed setting button B1.

In the present embodiment, in addition to the functions of the ordinary printer driver, a button B2 is provided as illustrated in FIG. 2. That is, if the user intends to store the attribute of a file in the MFP 2 in case of executing printing of the relevant file, he/she only has to check off the button B2.

Further, if the button B2 is checked off, then the user can input the password for permitting the browsing person to browse the attribute information stored in the MFP 2. As described above, in case of transmitting the print job, the printer driver transmits the above property and password to the MFP 2.

(Constitution of MFP 2)

Subsequently, the constitution of the MFP which is the printer at the transfer destination will be described.

Figure 3:
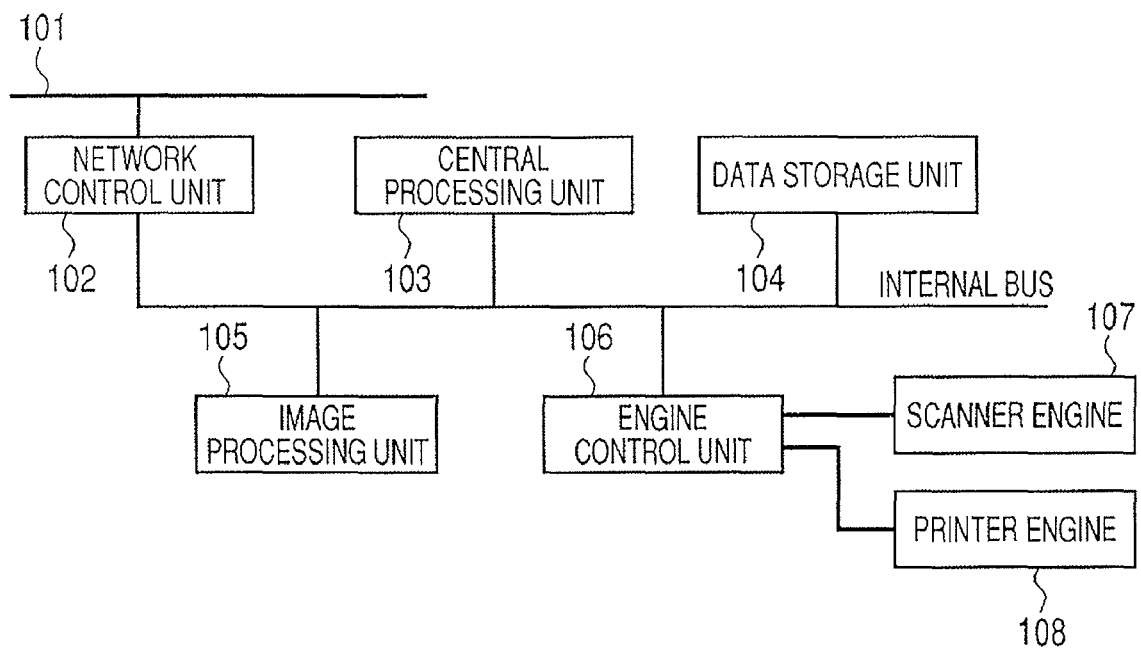
FIG. 3 is a block diagram illustrating the constitution of the main portion of a control unit provided in an MFP (multi function printer) illustrated in FIG. 1.

FIG. 3 is a block diagram illustrating the constitution of the main portion of a control unit provided in the MFP 2 illustrated in FIG. 1.

In FIG. 3, a mail message (data) from the PC 1 or the like is transmitted to a network control unit 102 through a network 101. Then, the network control unit 102 analyzes the protocol of the transmitted data, converts the relevant data into data for the internal bus, and transfers the converted data to a central processing unit 103. Here, the central processing unit 103 includes a CPU, a ROM and a RAM.

The central processing unit 103 controls the whole of the device, and also analyzes the mail transmitted from the PC 1 or the like through the network 101. Then, if the mail includes a request for printing the text thereof or an attached file, the central processing unit 103 converts such data into PDL data (i.e., print instruction data capable of being processed at high speed by a printer) in a later-described procedure.

Further, the PDL data converted by the central processing unit 103 is stored and held in a data storage unit 104 including a large-capacity storage medium until a print operation is executed by the user.

Furthermore, when the print operation is executed by the user, the PDL data stored in the data storage unit 104 is converted into bitmap data which can be directly printed by a printer engine 108. After then, an image gradation correction process, a filter process, and a resolution conversion process (if necessary) are executed to the converted bitmap data, and the acquired data is printed and output by the printer engine 108 through an engine control unit 106.

The engine control unit 106 has a function to convert bitmap data captured by a scanner engine 107 into data of transfer protocol on the internal bus, and a function to transfer the bitmap data through the internal bus to the printer engine 108.

Incidentally, print data is temporarily stored in the data storage unit 104. In addition, as well as statuses of the device (presence/absence of paper, standby/non-standby of the engine, and a residual quantity of toner), a history of the print job which is characterized in the present embodiment can be stored in the data storage unit 104. More specifically, if the "PROPERTY TRANSMISSION" button B2 is checked off and a password is input to the password input section 22 on the printer driver, when the printing is executed, the properties (path name, update date and time and creator of the original data) and the password are transferred to the MFP 2 and stored in the data storage unit 104 together with the history of the print job.

Further, in the present embodiment, the attributes of the original file (the name of the path in which the file exists, the file creator, the file size, the file creation date and time, the file update history, etc.) and the password are stored as described above.

(browsing of attribute of original file after print output)

Figure 4:
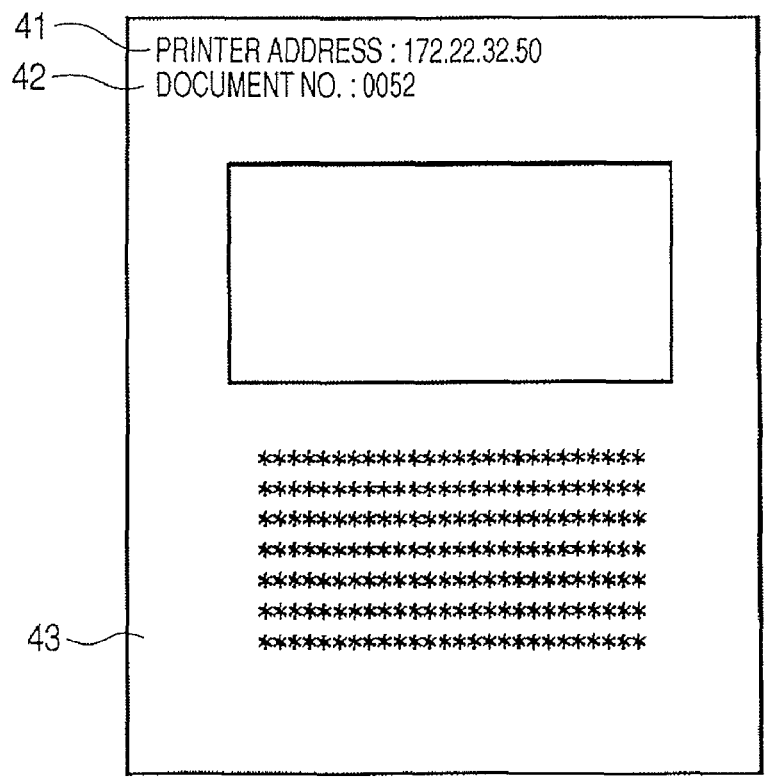
FIG. 4 is a diagram for describing an example of a paper to be output by the MFP illustrated in FIG. 1.

FIG. 4 is a diagram for describing an example of a paper to be output by the MFP 2 illustrated in FIG. 1.

In FIG. 4, if a print-output paper 43 is distributed in the conference or the like, the following process is executed so that a person to whom the distributed paper was distributed can easily search the original file. That is, if the attribute information of the original file can be acquired, the MFP 2 prints an IP address 41 of the printer and a document number 42 as illustrated in FIG. 4 at the head of the paper. Of course, such printing may not be executed according to the setting in the print output. Further, the IP address 41 of the printer and the document number 42 may be printed at a portion other than the head of the paper.

Furthermore, it is possible to control to print such information on a first page only, i.e., not all pages.

Then, the person to whom the paper 43 was distributed (i.e., job browsing person) inputs the IP address 41 of the printer to the URL input area of the browser on the PC 3, thereby activating a predetermined browser. Thus, as illustrated in FIG. 5, the screen for browsing the device information of the MFP 2 is displayed on the screen of the PC 3.

Each of FIGS. 5 to 9 is a diagram illustrating an example of a remote UI screen to be displayed on the display unit provided in the PC 1 and/or the PC 3 illustrated in FIG. 1. Here, since the remote UI screen is the screen on which a user can browse the device information and also execute setting of the MFP 2 (e.g., user mode, etc.), whereby this screen is called "remote UI" hereinafter.

Figure 5:
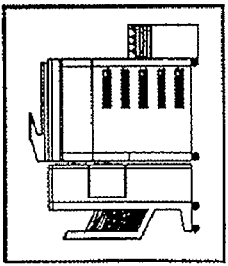
FIG. 5 is a diagram illustrating an example of a remote UI (user interface) screen to be displayed on the display unit provided in the PC illustrated in FIG. 1.

The displayed screen illustrated in FIG. 5 describes the example that a button B52 of "JOB" is selected and depressed by the user on the top screen of the remote UI, whereby the current job processing statuses are displayed in real time.

Figure 6:
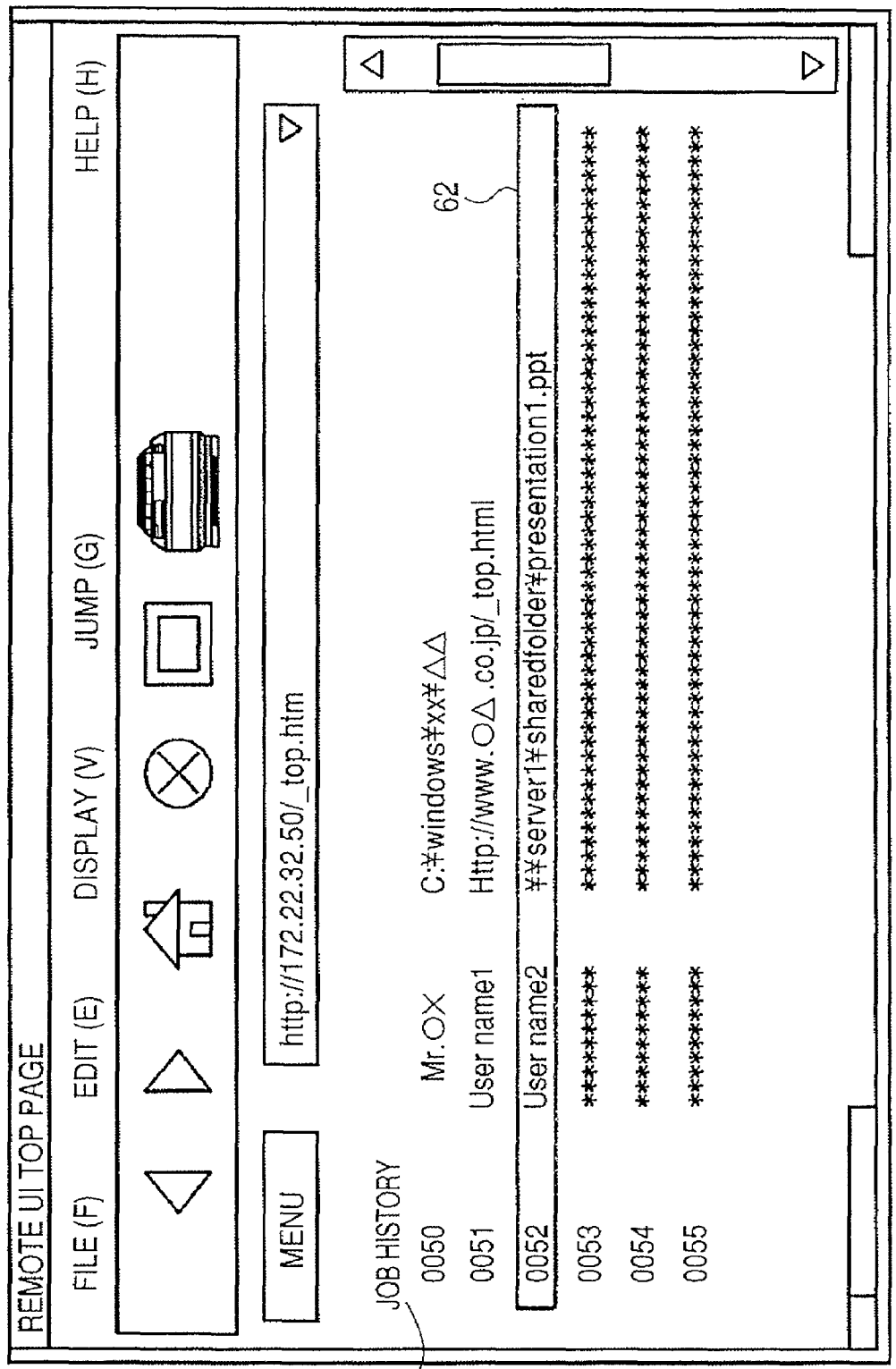
FIG. 6 is a diagram illustrating an example of the remote UI screen to be displayed on the display unit provided in the PC illustrated in FIG. 1.

Incidentally, if a button B51 of "HISTORY" is depressed by the user on the job display screen illustrated in FIG. 5, the screen to be displayed is changed to the screen illustrated in FIG. 6.

On the screen illustrated in FIG. 6, the document number "0052" corresponding to the actually printed document as illustrated in FIG. 4 is displayed in job histories 61 and also a history 62 is displayed adjacently to the number "0052". Thus, if the same number as "0052" is found and selected, then the path name of the corresponding original data is displayed.

Then, if the user wishes to browse the attribute information of the relevant original data in addition to the path name thereof, he/she handles the pointing device acting as the input device to right-click a mouse when a mouse cursor is at the position above the document number "0052". Subsequently, if the user selects "PROPERTY" from a displayed pull-down menu, an authentication screen 71 as illustrated in FIG. 7 is displayed on the display device of the PC 1.

On the authentication screen 71, authentication is executed to give permission to browse the detailed information of the original data. More specifically, the predetermined password which was transmitted from the printer driver and has been stored in the MFP 2 is input to a predetermined section on the authentication screen 71.

In other words, in the present embodiment, if the user wishes to browse the detail of the history, he/she has to previously confirm the correct password in some way from the print job output person.

Figure 7:
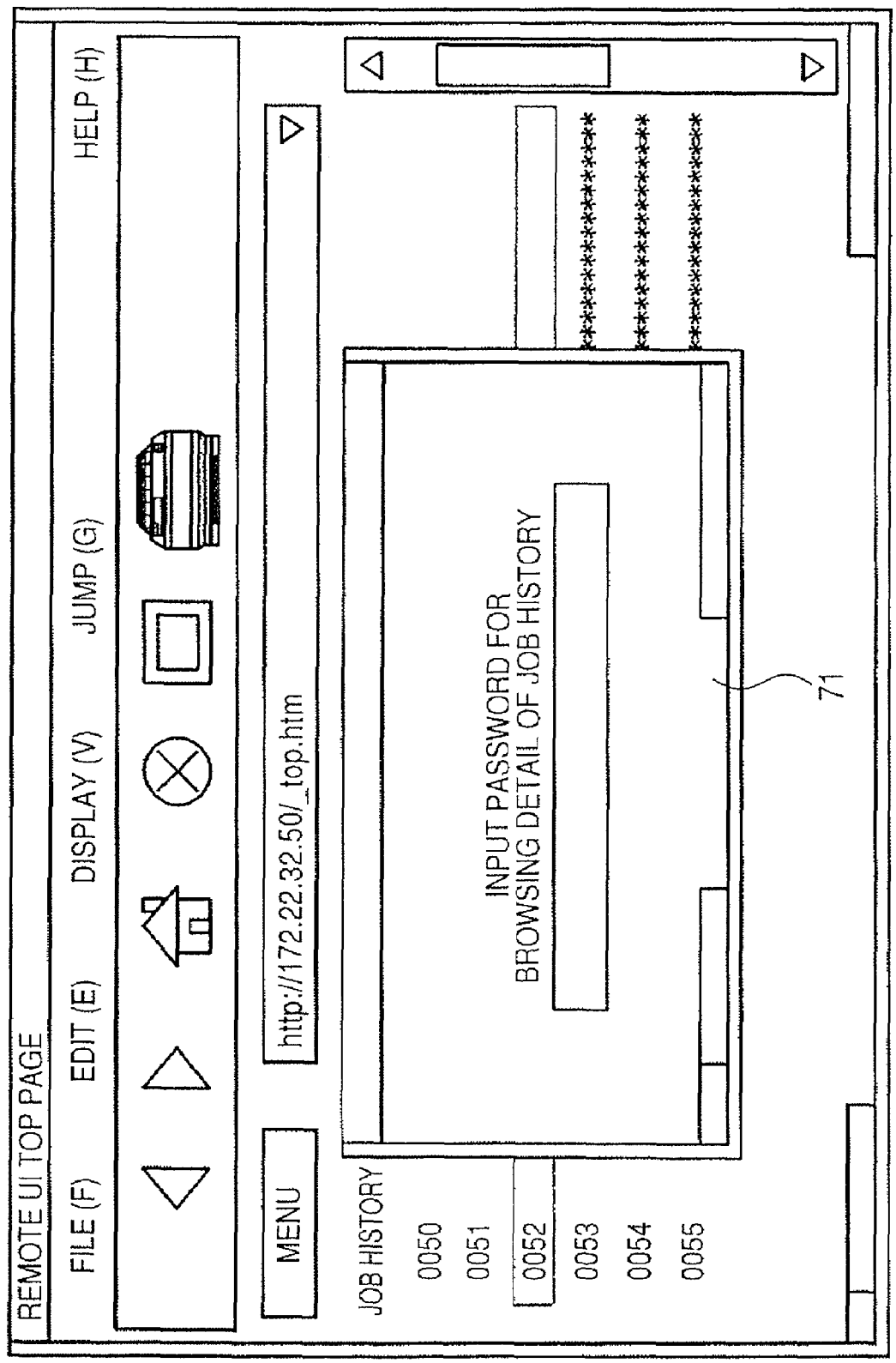
FIG. 7 is a diagram illustrating an example of the remote UI screen to be displayed on the display unit provided in the PC illustrated in FIG. 1.
Figure 8:
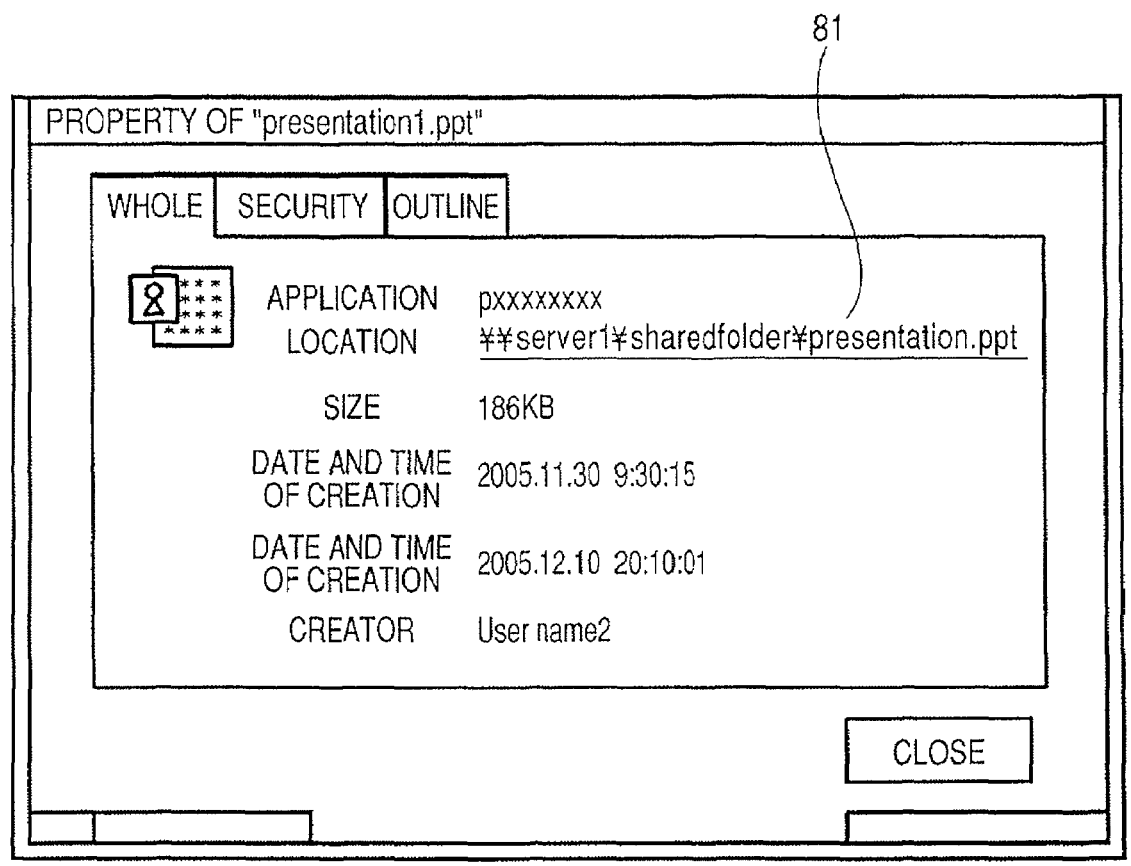
FIG. 8 is a diagram illustrating an example of the remote UI screen to be displayed on the display unit provided in the PC illustrated in FIG. 1.

Thus, if the user who wishes to browse the detail of the history inputs the predetermined password on the screen illustrated in FIG. 7, a property screen as illustrated in FIG. 8 is displayed on the display device, whereby the user can acquire or know the detailed information of the original file. Incidentally, the property screen illustrated in FIG. 8 includes a "WHOLE" tab sheet, a "SECURITY" tab sheet and an "OUTLINE" tab sheet, whereby it is controlled that the information of the original file is classified and displayed into the whole information, the security information and the outline information.

Thus, the history browsing person can acquire the size, the update date and time and the like of the original file so as to utilize them when determining whether or not to download, process and reuse the original file.

Incidentally, in this case, a unit for opening property information only has to match the data format thereof with that of the original file so as to execute property display in the same manner as for property display of an ordinary Windows™ PC file.

Further, in a case where the job browsing person browses the history on the PC 1 which is identical with that ordinarily used by the job output person, it is possible to use a unit for unconditionally displaying the screen as illustrated in FIG. 8 on the PC 1 without acquiring any password from the job output person.

Furthermore, the job browsing person moves the mouse cursor to "LOCATION" (path name) 81 on the property display screen as illustrated in FIG. 8, and then clicks the not-shown mouse. Thus, it is possible to directly link the original file without using the MFP 2, in the same manner as for an ordinary browser.

Figure 9:
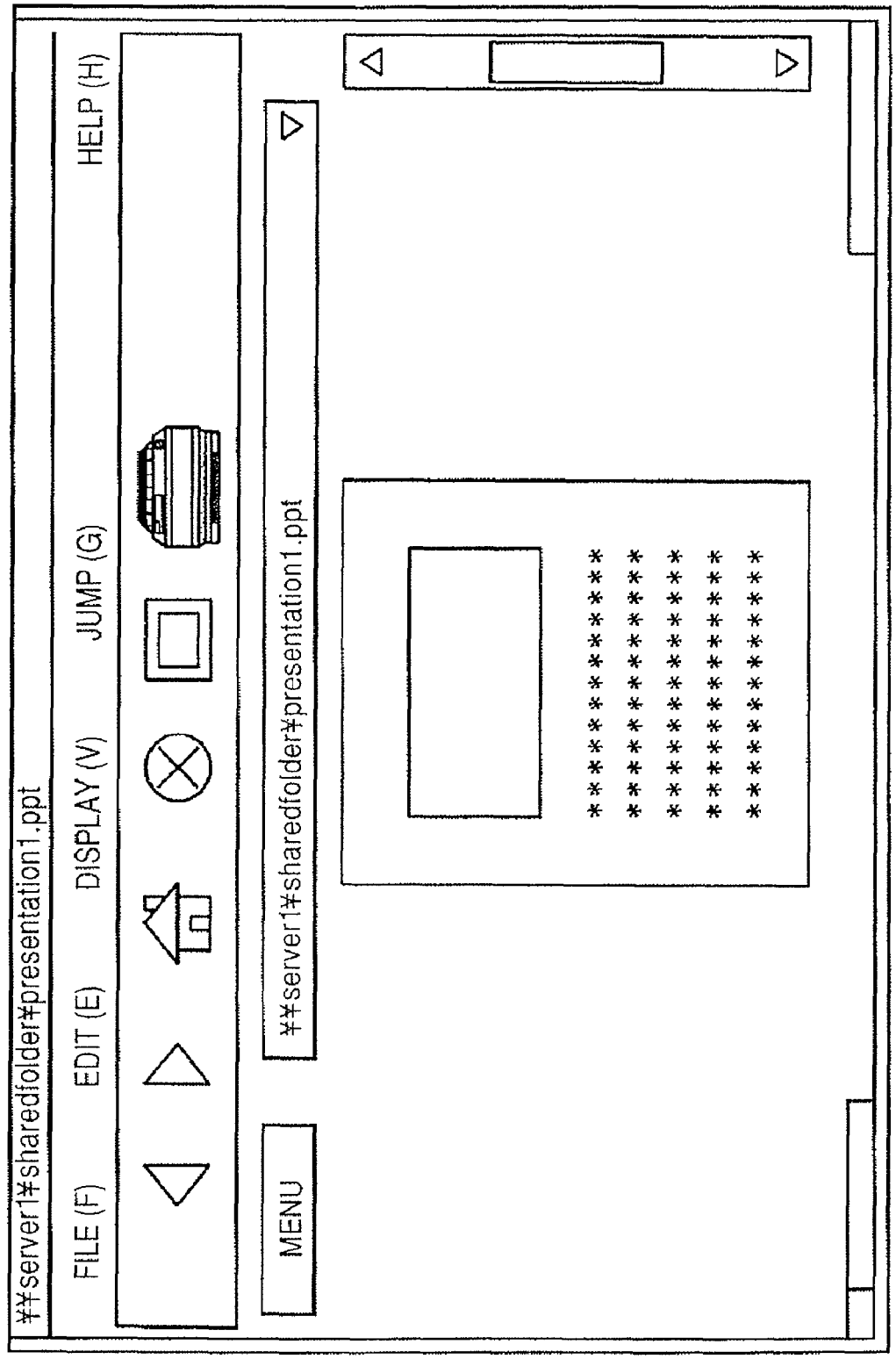
FIG. 9 is a diagram illustrating an example of the remote UI screen to be displayed on the display unit provided in the PC illustrated in FIG. 1.

As illustrated in FIG. 9, when "LOCATION" (path name) 81 is mouse-clicked by the job history browsing person on the screen illustrated in FIG. 8, the screen representing the status that the original file is opened on the remote UI is displayed.

Thus, the job history browsing person can hold the original file in the memory of the own PC 3. Further, if the job history browsing person activates a predetermined application, he/she can process and edit the browsed file.

According to the present embodiment, even if a storage unit for storing the original file is not provided in the MFP 2, the job history browsing person can easily acquire the original data with simple constitution.

Here, it should be noted that the image processing system as constituted above has the following characteristics.

The PC 1 and the PC 3 are constituted to be able to communicate with the MFP 2 which manages the history of the print job generated by the printer driver. Further, each of the PC's 1 and 3 has an accepting function to accept an instruction as to whether or not to add browsing management information of the original file in the print job to the relevant print job, thereby actually accepting the instruction issued by depressing the button B2 on the print setting screen illustrated in FIG. 2.

Furthermore, the printer driver has a transfer function to add, when the instruction as to whether or not to add the browsing management information to the print job is accepted by the depression of the button B2 on the print setting screen illustrated in FIG. 2, the browsing management information to the print job and then transfer the acquired print job to the MFP 2.

In addition, each of the PC's 1 and 3 has a request function to request to acquire the job list stored in the MFP 2, and a list display function to acquire the job list from the MFP 2 and display the acquired job list on the display device through the remote UI screen illustrated in FIG. 6.

Further, each of the PC's 1 and 3 has a determination function to determine, by referring the browsing management information, whether or not browsing limitation information has been set to a browsing job candidate selected from the job list displayed on the display device. Furthermore, each of the PC's 1 and 3 has an authentication function to authenticate, if it is determined that the browsing limitation information has been set, a browsing request person based on the browsing management information. More specifically, each of the PC's 1 and 3 urges the browsing request person to input a password as authentication information through the remote UI screen illustrated in FIG. 7.

Then, each of the PC's 1 and 3 has a browsing control function to acquire, if the browsing request person is authenticated as a rightful request person, the original file from a acquisition destination (i.e., the destination from which the original file is acquired) specified based on the browsing management information, and display the acquired original file on the display device as illustrated in FIG. 8.

Incidentally, if the browsing request person is the same as the registrant of the print job, the browsing control function skips the authentication process to be executed by an authentication unit.

Further, the browsing management information includes the attribute information including followup information, update information and creator information for specifying the original file in the print job, and the authentication information for authenticating the browsing request person.

On the other hand, the MFP 2 which processes the print jobs generated by the respective printer drivers of the PC's 1 and 3 has the following characteristics.

That is, the MFP 2 includes the data storage unit 104 as the storage unit for storing the history of the print job received from the PC 1 or 3. Here, the data storage unit 104 is generally made by, e.g., a hard disk, but may be made by another nonvolatile storage medium.

The central processing unit 103 has a registration function to register in the data storage unit 104 the browsing management information of the original file added to the print job received from the PC 1 or 3. Further, the engine control unit 106 and the printer engine 108 are provided to execute a print function to print the print data based on the print job and also print as a layout the browsing management information registered in the data storage unit 104.

Furthermore, the central processing unit 103 has a transfer function to generate list information of the print jobs stored in the data storage unit 104 based on a print job list request issued from the PC 1 or 3, add the browsing management information to the print job, and transfer the acquired print job to the PC 1 or 3.

Here, the browsing management information includes the attribute information including followup information, update information and creator information for specifying the original file in the print job, and the authentication information for authenticating the browsing request person.

Figure 10:
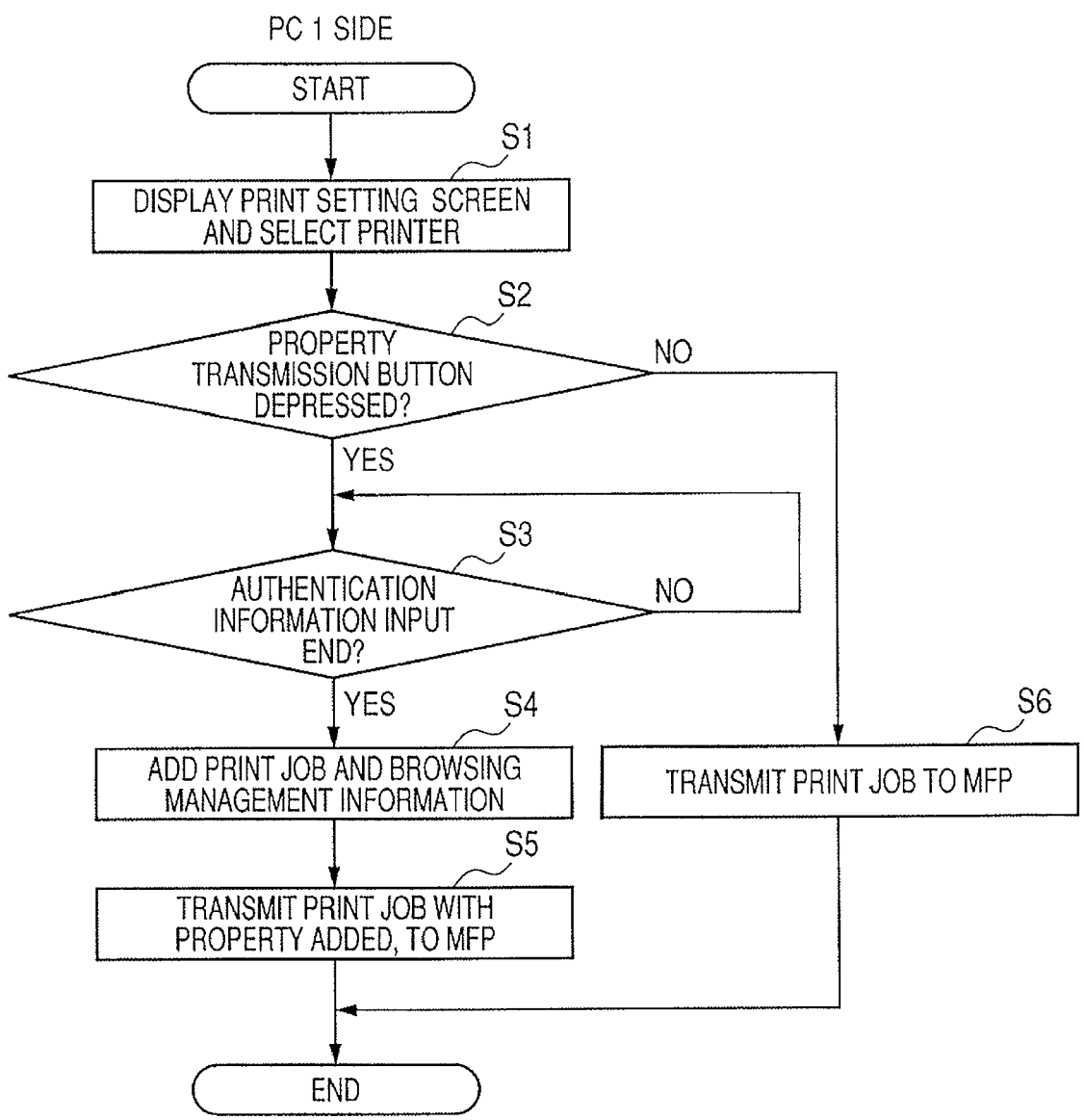
FIG. 10 is a flow chart describing an example of a first data processing procedure in the information processing device according to the first exemplary embodiment of the present invention.

FIG. 10 is a flow chart describing an example of a first data processing procedure in the information processing device according to the present embodiment. Here, it should be noted that the process in FIG. 10 is an example of the process illustrated in FIG. 1 for transmitting the print information from the PC 1 to the MFP 2. Incidentally, respective steps S1 to S6 illustrated in FIG. 10 are achieved in a case where the CPU of the PC 1 loads and executes a control program (print control program) on the RAM thereof. Here, it should be noted that the print control program corresponds to the function process of the printer driver for the MFP 2.

First, a user of the PC 1 instructs printing through an in-execution application or the like to display the print setting screen as illustrated in FIG. 2 on the display device, and then selects the printer (S1).

Next, the user handles the pointing device such as the mouse to indicate the button B2 illustrated in FIG. 2 by the cursor, and the printer driver determines whether or not the button of the mouse has been clicked (S2). Then, if the CPU of the PC 1 determines that the button B2 is not indicated but a not-illustrated print button is indicated by the cursor, the flow advances to the step S6. In the step S6, the OS of the PC 1 converts drawing information given by the application into a GDI (Graphics Device Interface) command, and transfers the acquired GDI command to the printer driver. Thus, the print job is transmitted to the MFP 2, and the process ends.

On the other hand, if the CPU of the PC 1 determines in the step S2 that the button B2 is indicated, it waits until the password (authentication information) for permitting the browsing person to browse the attribute information stored in the MFP 2 is input to the password input section 22 (S3).

Then, if the authentication information is input, the printer driver adds to the print job the browsing management information including the input authentication information and the attribute information of the original file which is generated by the application and is to be printed (S4).

Subsequently, in the step S5, the browsing management information is added to the generated print job, the acquired print job is transmitted to the MFP 2, and the process ends.

Incidentally, it should be noted that the attribute information of the file may include, for example, a name of the path in which the relevant file exists (PC name, directory, file name), a file creator, a file size, a file creation date and time, a file update history, and the like.

Figure 11:
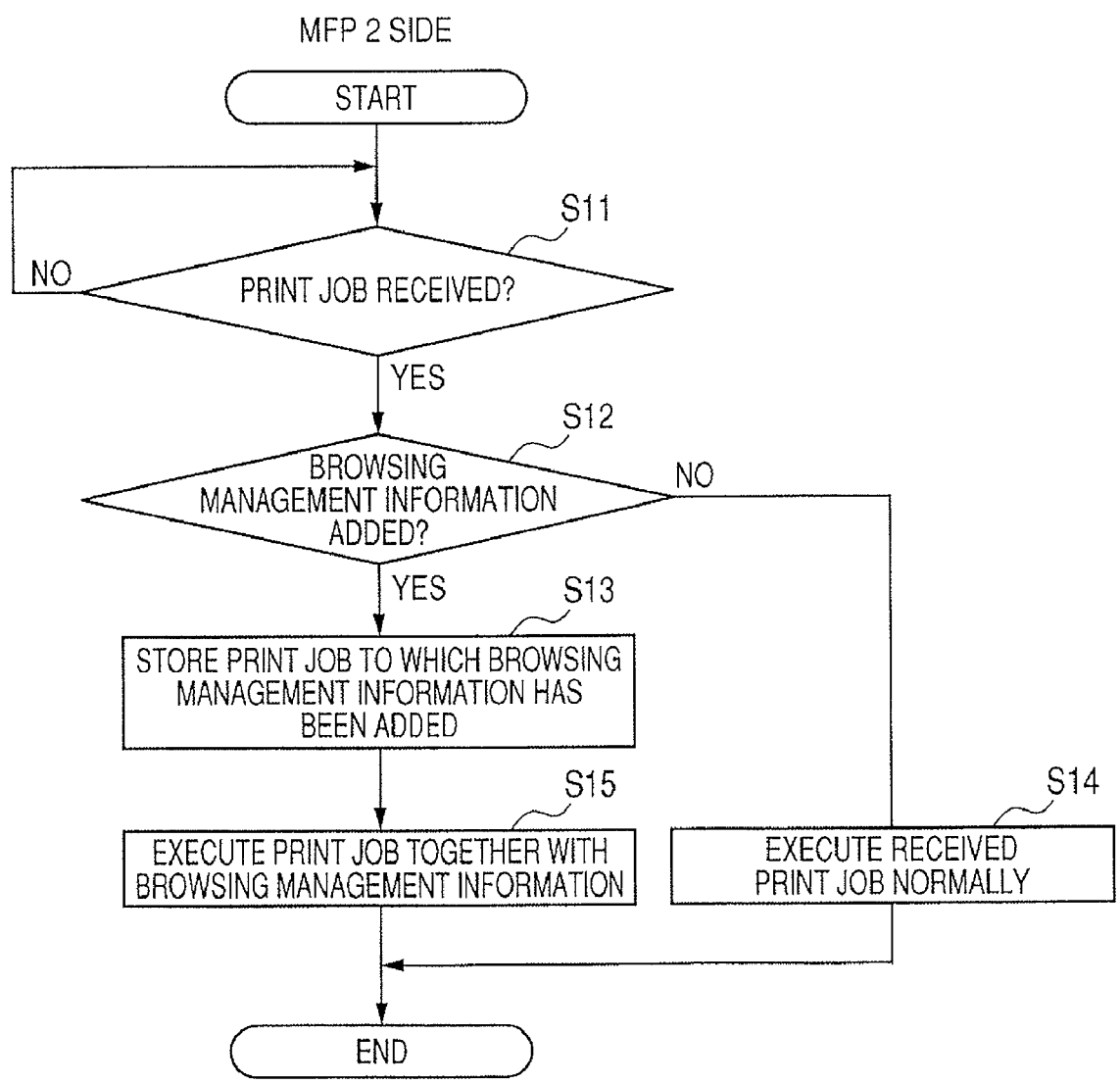
FIG. 11 is a flow chart describing an example of the first data processing procedure in the information processing device according to the first exemplary embodiment of the present invention.

FIG. 11 is a flow chart describing an example of the first data processing procedure in the information processing device according to the present embodiment. Here, it should be noted that the process of FIG. 11 corresponds to the print job processing procedure to be executed by the central processing unit 103 of the MFP 2 illustrated in FIG. 1. Incidentally, respective steps S11 to S15 illustrated in FIG. 11 are achieved in a case where the central processing unit 103 of the PC 2 illustrated in FIG. 1 loads a control program from an external memory or the ROM to the RAM and executes the loaded program.

First, in the step S11, the central processing unit 103 waits for the print job transmitted from the PC on the network through the network control unit 102. Then, for example, if the print job is received from the PC 1, the central processing unit 103 determines whether or not the browsing management information has been added to the received print job (S12).

If it is determined that the browsing management information has been added to the received print job, the central processing unit 103 extracts the received print job into raster image data. At the same time, the central processing unit 103 superposes, for example, the IP address 41 and the document number 42 extracted from the browsing management information at the location designated on the paper (this location may be designated by user), and executes printing (S15). Then, the process ends, whereby the print result as illustrated in FIG. 4 is acquired.

On the other hand, if it is determined in the step S12 that the browsing management information is not added to the received print job, the central processing unit 103 executes the received print job normally (S14), and then the process ends. Incidentally, in the step S14, the executed print job may be stored in the data storage unit 104 substantially in parallel with the print process.

Figure 12:
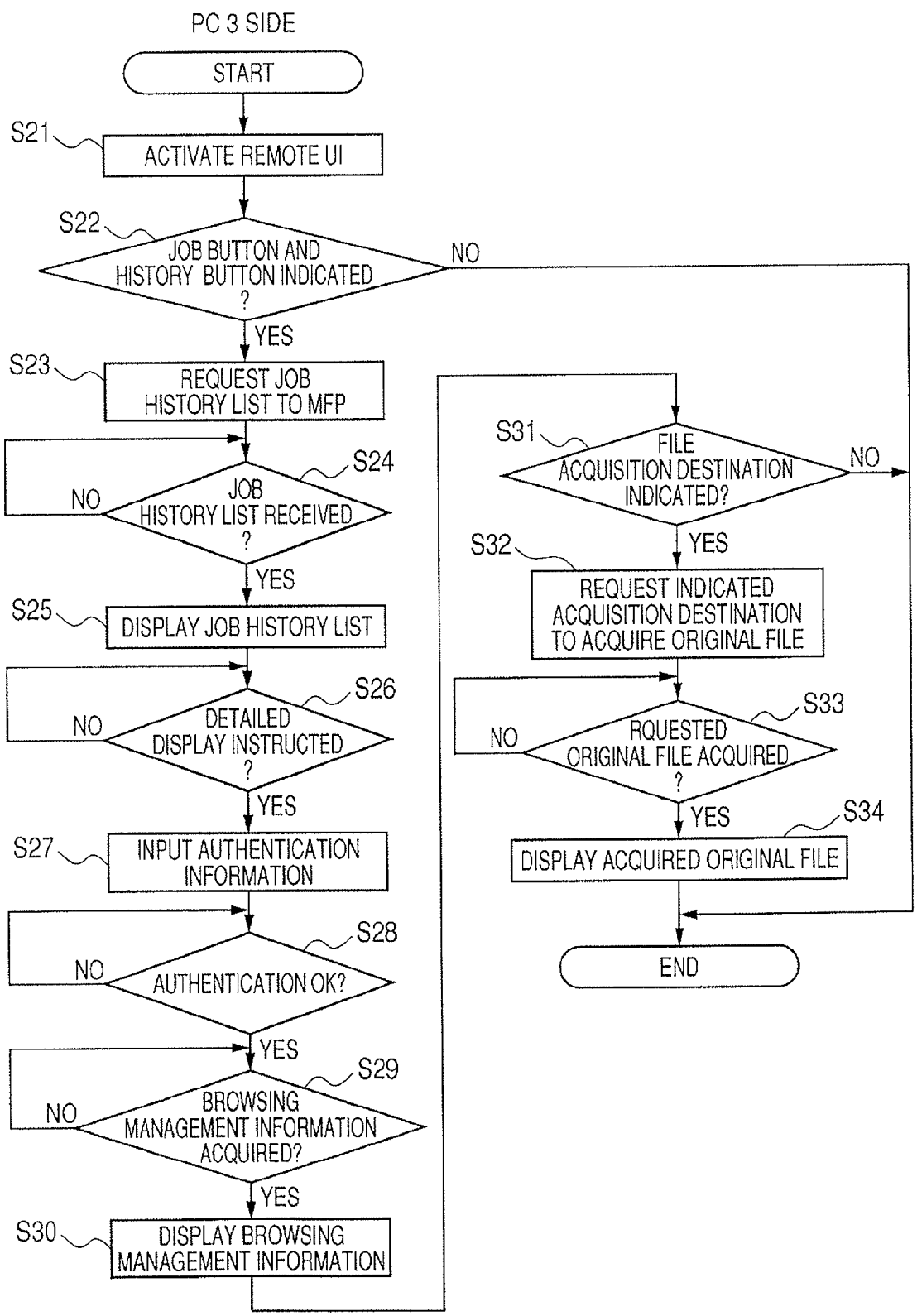
FIG. 12 is a flow chart describing an example of a second data processing procedure in the information processing device according to the first exemplary embodiment of the present invention.

FIG. 12 is a flow chart describing an example of a second data processing procedure in the information processing device according to the present embodiment. Here, it should be noted that the process of FIG. 12 corresponds to the process that the PC 3 of FIG. 1 used by the print job browsing person requests the history list of the print job to the MFP 2, acquires the browsing management information, acquires the original file of the print job, and then prints the acquired original file. Incidentally, respective steps S21 to S34 illustrated in FIG. 12 are achieved in a case where the CPU of the PC 3 loads and executes a control program (print control program) on the RAM thereof. Here, it should be noted that the print control program corresponds to the function process of the utility program for the MFP 2.

First, the user of the PC 3 activates the remote UI (corresponding to the screen illustrated in FIG. 5) acting as the utility program (S21). Incidentally, it should be noted that the screen illustrated in FIG. 5 is displayed by depressing the "DEVICE" button on the utility-program screen.

Next, it is determined whether or not the "JOB" button B52 and the "HISTORY" button B51 are indicated (S22) Here, if it is determined that the "JOB" button B52 and the "HISTORY" button B51 are not indicated, then the process ends.

On the other hand, if it is determined in the step S22 that the "JOB" button B52 and the "HISTORY" button B51 are indicated, the request for acquiring a job history list is transmitted from the PC 3 to the MFP 2 (S23).

Then, if job history list information is received from the MFP 2 through the network (S24), it is controlled to display the received job history list screen on the screen illustrated in FIG. 6 (S25).

Next, as illustrated in FIG. 6, the central processing unit 103 determines whether or not the history 62 is indicated on the job histories 61, that is, whether or not the detailed display of the print job is instructed (S26).

If it is determined that the history 62 is indicated on the job histories 61, the central processing unit 103 displays on the display device the screen as illustrated in FIG. 7 to urge the user to input the authentication information. Here, the user of the PC 3 inputs the authentication information previously specified between the user and the owner of the original file by handling the keyboard or the like (S27).

Then, if the central processing unit 103 determines that the input authentication information coincides with the stored authentication information (i.e., authentication "OK"), it waits until the browsing management information is acquired from the MFP 2 through the network (S29). Subsequently, if the central processing unit 103 acquires the browsing management information, the attribute information (property) which is the browsing management information of the original file is displayed on the display device as illustrated in FIG. 8 (S30).

Here, the user of the PC 3 indicates the original file acquisition destination (the destination from which the original file is acquired), in the displayed attribute information. That is, the central processing unit 103 determines whether or not the "LOCATION" (path name) 81 is indicated on the property display screen illustrated in FIG. 8 (S31). Then, if it is determined by the central processing unit 103 that the "LOCATION" 81 is not indicated, the process ends.

On the other hand, if it is determined in the step S31 by the central processing unit 103 that the original file acquisition destination is indicated, the central processing unit 103 requests to acquire the original file from the indicated acquisition destination (S32). Here, it should be noted that such acquisition of the original file may be directly requested by the remote UI, or an acquisition request based on an HTTP (HyperText Transport Protocol) may be issued on the network by activating the browser of the PC 3.

Then, if the central processing unit 103 acquires the requested original file through the network or the like (S33), the drawing process is executed to the acquired original file. Thus, the screen as illustrated in, for example, FIG. 9 is displayed on the display device (S34), and the process ends.

Incidentally, if a device button on the screen illustrated in FIG. 8 is indicated, the display screen can be transmitted to and printed by the MFP 2, stored in a storage device, and given to and processed by another application.

Further, although the process according to the present embodiment is executed by the PC 3, the PC 1 can of course request the relevant process. For example, in a case where, immediately after the step S26 in FIG. 12, the central processing unit 103 checks and determines that the information of the request person and the information of the original file creator are the same, it is possible to skip the steps S26 to S28.

Consequently, it is possible to avoid executing the useless steps until the user on the PC 1 side narrows down, searches and displays the original file from the job history.

According to the present embodiment, a person at the distribution destination can know the location of the file of the original data through a simple browser by only checking the "PROPERTY TRANSMISSION" button on the printer driver, and thus access the original file.

As just described, if the person to whom the paper was distributed wishes to acquire the original data through the PC 3, he/she refers the job history after inputting the password on the remote UI (or operation unit). Then, he/she can browse the property (attribute information) of the relevant file, and thus acquire and directly access the information concerning the original file.

Incidentally, in the present embodiment, the browsing request person is authenticated on the side of the PC 1 or 3. However, such authentication may be executed through the communication between the MFP 2 and the PC 1 or 3.

Further, the authentication process can also be executed by using authentication information which is stored in another storage medium, that is, a portable storage medium such as an IC card, a USB memory or the like.

Second Exemplary Embodiment

In the above first exemplary embodiment, the job history browsing person browses, from the PC on the network, the job history through the network. However, such browsing can be executed on the screen of the operation unit provided on the MFP 2.

Figure 13:
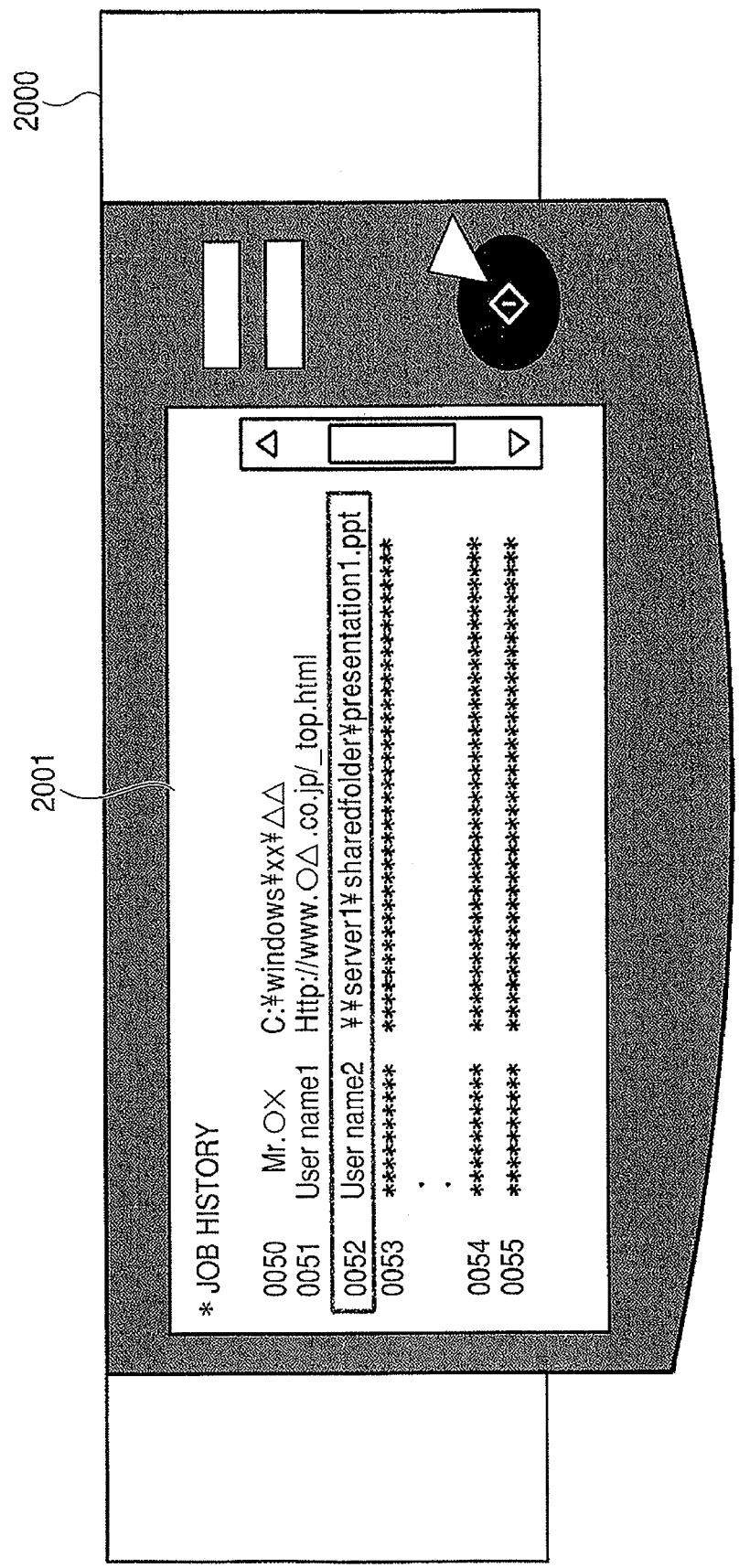
FIG. 13 is a diagram illustrating an example of the screen of the operation unit provided on an image processing device according to a second exemplary embodiment of the present invention.

FIG. 13 is a diagram illustrating an example of the screen of the operation unit provided on the image processing device according to the second exemplary embodiment of the present invention.

In FIG. 13, an operation unit 2000 is constituted to be able to display the job history screen when a not-illustrated mode key is handled. Further, the operation unit 2000 includes a touch panel portion and a liquid crystal display portion.

Incidentally, it should be noted that, as well as the first exemplary embodiment, the authentication process is executed with respect to user's browsing authority when browsing of the job list is requested.

In the present embodiment, when the user instructs through the operation unit 2000 of the MFP 2 to browse the job history, the central processing unit 103 of the MFP 2 displays, for example, a browsing screen 2001.

Incidentally, in the present embodiment, the job history information same as that displayed on the job list screen illustrated in FIG. 6 can be displayed. Therefore, the user can acquire the detailed attribute information of the original file from the job history by using the screen on the operation unit, and thus access and process the original file.

Third Exemplary Embodiment

In the above exemplary embodiments, the MFP 2 manages the browsing request of the stored print job. However, it should be noted that the present invention is also applicable to an image processing system in which the history information of the print job stored in the MFP 2 is managed by a server device of the network.

In this case, the user of the PC 3 has to request browsing to the server device. However, other processes in the present embodiment are the same as those in the first and second exemplary embodiments.

Fourth Exemplary Embodiment

Hereinafter, the configuration of a data processing program capable of being read by the information processing device according to the present invention will be described with reference to memory maps illustrated in FIG. 14 and FIG. 15.

Figure 14:
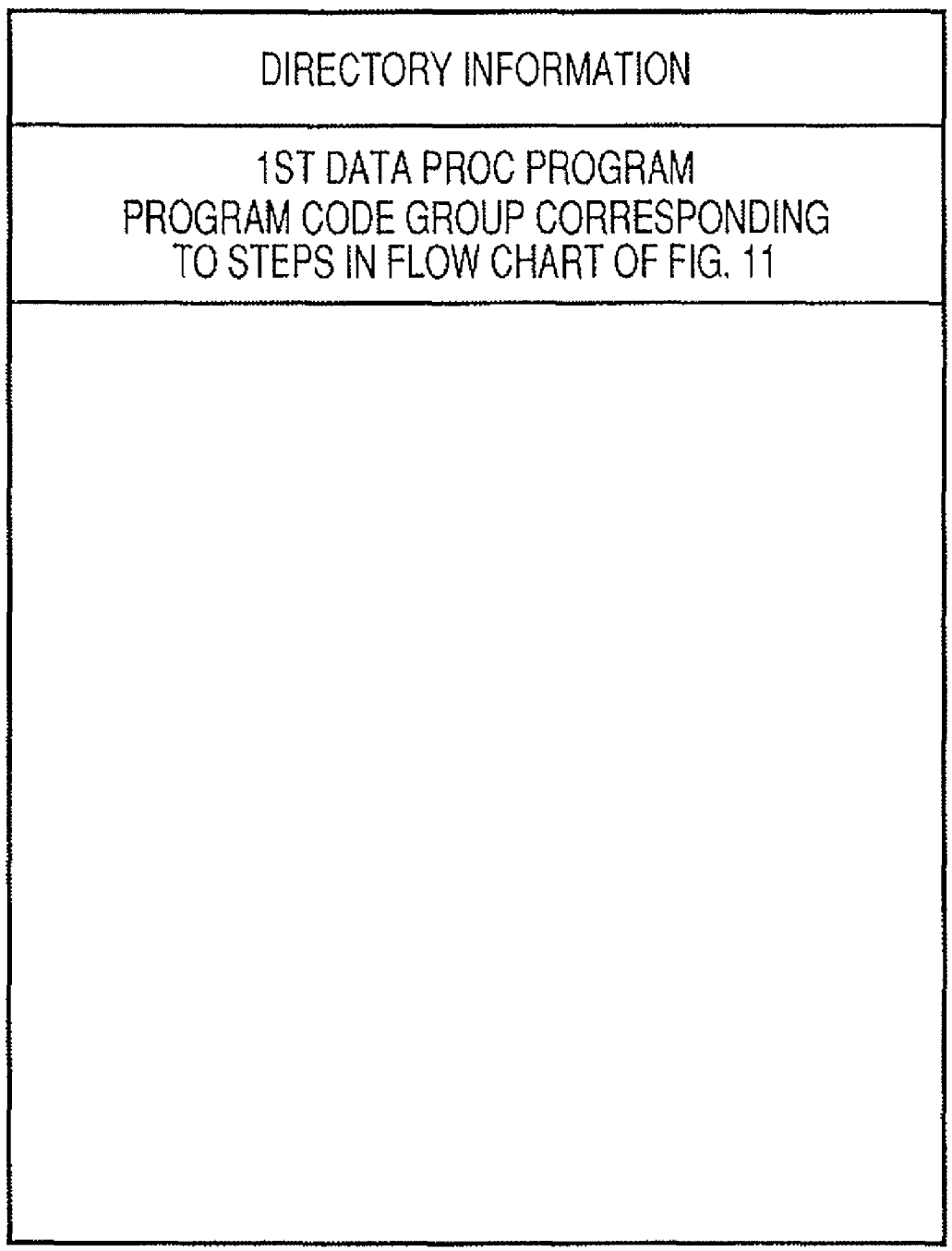
FIG. 14 is a diagram for describing a memory map of a storage medium which stores therein various data processing programs capable of being read by the information processing device according to the present invention.

FIG. 14 is the diagram for describing the memory map of a storage medium which stores therein various data processing programs capable of being read by the information processing device according to the present invention.

FIG. 15 is the diagram for describing the memory map of a storage medium which stores therein various data processing programs capable of being read by the image processing device according to the present invention.

Incidentally, although it is not illustrated specifically, also information (e.g., version information, creator information, etc.) for managing program groups stored in the storage medium may occasionally be stored in the storage medium, and information (e.g., icon information for discriminatively displaying a program, etc.) depending on an OS or the like on the program reading side may occasionally be stored in the storage medium.

Moreover, the data depending on various programs are managed on the directory of the storage medium. Besides, a program to install the various programs into a computer, a program to extract the installed programs and data when the installed programs and data have been compressed, and the like are occasionally stored in the storage medium.

Furthermore, the functions described in FIG. 10, FIG. 11 and FIG. 12 may be executed by a host computer based on externally installed programs. In that case, the present invention is applicable even in a case where an information group including the programs is supplied from a storage medium (such as a CD-ROM, a flash memory, an FD or the like) or an external storage medium through a network to an output device.

Incidentally, it is needless to say that the object of the present invention can be achieved in a case where the storage medium storing the program codes of software to realize the functions of the above exemplary embodiments is supplied to a system or a device and then a computer (or CPU or MPU) in the system or the device reads and executes the program codes stored in the storage medium.

In that case, the program codes themselves read from the storage medium realize the new functions of the present invention, whereby the storage medium which stores these program codes constitutes the present invention.

Therefore, because the form of program is no object if it has an actual function as the program, an object code, a program executed by an interpreter, script data supplied to an OS, and the like may be included as the program.

As the storage medium for supplying the program codes, for example, a flexible disk, a hard disk, an optical disk, a magnetooptical disk, an MO, a CR-ROM, a CD-R, a CD-RW, a magnetic tape, a nonvolatile memory card, a ROM, a DVD or the like can be used.

In this case, the program codes themselves read from the storage medium realize the functions of the above exemplary embodiments, whereby the storage medium storing those program codes constitutes the present invention.

Besides, as a method of supplying programs, there is a method of connecting with a home page on the Internet by using the browser of the client computer, and downloading the computer program itself of the present invention or a compressed file including an automatic installing function together with the computer program into the recording medium such as a hard disk or the like. Moreover, there is a method of dividing the program codes constituting the program of the present invention into plural files and downloading the respective files from different Web sites. That is, a WWW server, an FTP (file transfer protocol) server and the like for downloading the program files for achieving the function processes of the present invention with use of the computer to plural users are included in the scope of the present invention.

Moreover, it is possible to encrypt the program of the present invention, store the encrypted program in the storage medium such as a CD-ROM or the like, distribute the obtained storage media to users, cause the user who has satisfied a predetermined condition to download key information for decrypting the encrypted program from the Web site through the Internet, cause the relevant user to install the decrypted program into an appropriate computer, and thus achieve the functions of the present invention.

Moreover, it is needless to say that the present invention includes not only a case where the functions of the above exemplary embodiments are realized by executing the program codes read by the computer, but also a case where an OS (operating system) or the like functioning on the computer executes a part or all of the actual process according to instructions of the program codes, whereby the functions of the above exemplary embodiment are achieved by the relevant process.

Moreover, it is needless to say that the functions of the above exemplary embodiments can be achieved in a case where the program codes read from the storage medium are once written in the memory provided in a function expansion board inserted in the computer or a function expansion unit connected to the computer, and then the CPU or the like provided in the function expansion board or the function expansion unit executes a part or all of the actual process according to the instructions of the program codes.

While the present invention has been described with reference to what is presently considered to be the exemplary embodiments, it is to be understood that the invention is not limited to the disclosed embodiments. On the contrary, the present invention is intended to cover various modifications and equivalent arrangements (including the organic combination of respective exemplary embodiments) included within the spirit and scope of the present invention.

The scope of the following claims is to be accorded the broadest interpretation so as to encompass all such modifications and equivalent structures and functions. Although the exemplary embodiments have been explained by way of various examples, it is apparent for one of ordinary skill in the art that the object and the scope of the present invention are not limited to the specific descriptions in the present application.

This application claims the benefit of Japanese Patent Application No. 2006-068731, filed on Mar. 14, 2006, which is hereby incorporated by reference herein in its entirety.

What is claimed is:

1. An image processing device comprising:
a reception unit constructed to receive print data and path information of an original file of the print data, from a first external apparatus;
a print unit constructed to print the received print data;
a storage unit constructed to store the received path information; and
a transmission unit constructed to transmit to a second external apparatus a link to the original file of the print data which has been printed, in a case of causing the second external apparatus to display history information of the print data which has been printed, wherein the link is based on the path information stored in the storage unit.

2. An image processing device as claimed in claim 1, wherein, in a case where the print data and the path information of the original file of the print data are received by the reception unit, the print unit prints, together with the print data, discrimination information indicating the image processing device.

3. An image processing device as claimed in claim 2, wherein the second external apparatus accesses the image processing device by using the discrimination information printed by the print unit and the transmission unit transmits the link to the second external apparatus in response to the access from the second external apparatus.

4. An image processing device as claimed in claim 2, wherein the discrimination information includes an IP address of the image processing device.

5. An image processing device as claimed in claim 1, wherein the link is displayed on a web browser provided by the second external apparatus.

6. An image processing device as claimed in claim 1, further comprising a display unit constructed to display a screen which displays the history information and includes the link to the original file of the print data.

7. The device according to claim 1, wherein the first external apparatus and the second external apparatus are the same apparatus.

8. An image processing method comprising:
receiving print data and path information of an original file of the print data, from a first external apparatus;
printing the received print data, by a print unit;
storing the received path information in a storage unit; and
transmitting to a second external apparatus a link to the original file of the print data which has been printed, in a case of causing the second external apparatus to display history information of the print data which has been printed, wherein the link is based on the path information stored in the storage unit.

9. The method according to claim 8, wherein the first external apparatus and the second external apparatus are the same apparatus.

10. A non-transitory computer-readable recording medium recording a computer program executable by an image processing device for executing a process to carry out an image processing method, the method comprising:
receiving print data and path information of an original file of the print data, from a first external apparatus;
printing the received print data, by a print unit;
storing the received path information a storage unit; and
transmitting to a second external apparatus a link to the original file of the print data which has been printed, in a case of causing the second external apparatus to display history information of the print data which has been printed, wherein the link is based on the path information stored in the storage unit.

11. The computer-readable recording medium according to claim 10, wherein the first external apparatus and the second external apparatus are the same apparatus.

* * * * *